United States Patent
Yu et al.

(10) Patent No.: US 7,598,625 B2
(45) Date of Patent: Oct. 6, 2009

(54) NETWORK-BASED AIRCRAFT SECONDARY ELECTRIC POWER DISTRIBUTION SYSTEM

(75) Inventors: Wenjiang Yu, Mississauga (CA); Zhenning Z. Liu, Mississauga (CA)

(73) Assignee: Honeywell International Inc., Morristown, NJ (US)

(*) Notice: Subject to any disclaimer, the term of this patent is extended or adjusted under 35 U.S.C. 154(b) by 175 days.

(21) Appl. No.: 11/760,579

(22) Filed: Jun. 8, 2007

(65) Prior Publication Data

US 2008/0303353 A1   Dec. 11, 2008

(51) Int. Cl.
  *B60L 1/00* (2006.01)
(52) U.S. Cl. .................... 307/9.1; 307/131; 340/825.69
(58) Field of Classification Search ................. 307/9.1, 307/131; 361/100, 93.9, 93.1; 700/295; 340/825.69
See application file for complete search history.

(56) References Cited

U.S. PATENT DOCUMENTS

| | | | |
|---|---|---|---|
| 5,576,700 A * | 11/1996 | Davis et al. ................. 340/3.31 |
| 5,598,039 A * | 1/1997 | Weber ......................... 307/38 |
| 5,752,047 A | 5/1998 | Darty et al. |
| 6,052,268 A * | 4/2000 | Thomas ...................... 361/103 |
| 6,832,135 B2 * | 12/2004 | Ying .......................... 700/295 |
| 7,049,932 B2 * | 5/2006 | French et al. ................ 340/7.1 |
| 7,162,653 B2 * | 1/2007 | Mares et al. ................ 713/310 |
| 2006/0101296 A1 | 5/2006 | Mares et al. |

OTHER PUBLICATIONS

Fox, Duane G., "Integrated Control Techniques for Advanced Aircraft Electrical Power Systems", Journal of Energy, Jan.-Feb., 1982, p. 54-58, v 6, n.1, ISSN: 0146-0412 CODEN: JENED5.

* cited by examiner

*Primary Examiner*—Albert W Paladini
(74) *Attorney, Agent, or Firm*—Oral Caglar, Esq.

(57) ABSTRACT

A system and method for control of an electric power distribution system is provided, which uses a communication network for centralized monitoring and control of the supply of electricity to a load. In one embodiment, the invention may use a wireless communication system connecting control nodes and master nodes to control and monitor a solid state power controller. As a result, the master node may remotely turn on and off the electrical power to the load. Also the control node may sense the current being supplied to the load and may turn off the supply of electrical power in the event of an over current situation. The control node may also report the state of the sensed current to the master node. In another embodiment, the communication system may be a power line carrier network.

19 Claims, 5 Drawing Sheets

NETWORK-BASED AIRCRAFT SECONDARY ELECTRIC POWER DISTRIBUTION SYSTEM

BACKGROUND OF THE INVENTION

The present invention relates to secondary electrical power distribution systems and more particularly to secondary electrical power distribution systems having network-controlled solid state power controllers.

In a conventional secondary electrical power distribution system (SEPDS), such as those used on aircraft, electric power is distributed to electrical loads through electromechanical relays in combination with circuit breakers. Due to increasing demands in avionic systems, there is a need for improvements in SEPDSs in the areas of reliability, size, weight and cost, which cannot always be met by electromechanical systems.

As a result, SEPDSs which use solid state power controller (SSPC) technology as an electric management center have been introduced. SSPCs offer a number of advantages over electromechanical relays and circuit breakers. In such systems, several SSPC channels are usually located on one circuit card assembly (CCA) and several of these CCAs are then installed in one line replaceable unit (LRU). The control of the SSPC channels is usually through a centralized gateway designated for the LRU via a main data bus. The local control circuitry on each CCA interfaces to the gateway via an internal data bus inside the LRU.

SEPDSs that utilize SSPC technology achieve some of the above-discussed needed improvements over electromechanical technology. Also, SSPC provides system intelligence, remote control, and convenient maintenance. However, there is still a need for improvements to SSPC-based SEPDS. Centralized control can introduce additional wiring and hardware, increase power consumption, and add to the material cost and to the system weight as compared to some electromechanical systems. The increased complexity of SSPC-based SEPDSs also can create reliability issues. Dependency among various SSPC channels means that the failure of one SSPC channel can affect other SSPC channels. There is also a need to reduce thermal dissipation in SSPC technology-based SEPDs, where, for example, several SSPC channels may be clustered in one CCA, and several CCAs, may be clustered in one envelope to share a common backplane, power supply and data bus. Also, SSPC-based SEPDs can not always be easily retrofitted into older systems that have electromechanical SEPDS.

As can be seen, there is a need for an SSPC-based SEPD which minimizes the hardware, power consumption, thermal dissipation, weight, size, and cost. There is a further need for an SSPC-based SEPD with improved reliability over existing systems. Still further there is a need for an SSPC-based SEPD that is easily retrofitted into an existing electro-mechanical SEPD system.

SUMMARY OF THE INVENTION

In one aspect of the present invention, an electric power distribution system comprises: at least one source of electrical power; at least one load connected by a conductor to the at least one source of electrical power; a switch disposed across the conductor, the switch connecting the load to the at least one source of electrical power when in a closed state and disconnecting the load from the at least one source of electrical power when in an open state; at least one master node; and a wireless communication network carrying commands from the master node to the switch to open the switch and commands to close the switch.

In another aspect of the present invention a system for sensing electrical power transferred to a load comprises: a load; a source of electrical power connected by a conductor to the load; a sensor connected to the conductor, the sensor detecting a current passing through the conductor; a microcontroller connected to the sensor; and a wireless communication network coupled to the sensor and to the microcontroller carrying information regarding the current detected by the sensor.

In a further aspect of the present invention, a method for controlling an electric power distribution system comprises: transferring electrical power from a source to a load through a conductor, the conductor having a switch connected to a control node; sending a plurality of commands from a master node to the control node through a powerline carrier communication network, the plurality of commands including commands to open the switch and commands to close the switch; receiving the plurality of commands in the control node through the powerline carrier communication network; sending a plurality of signals to the switch from the control node, a first type of the plurality of signals causing the switch to open and a second type of the plurality of signals causing the switch to close; and opening the switch in response to the command to open the switch and closing the switch in response to the command to close the switch.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a system and method for control of an electric power distribution system. The present invention may use a communication network for centralized monitoring and control of the supply of electricity to a load. The present invention may be advantageously employed in a variety of applications. One application is on aircraft, where electrical power is supplied to a large number of loads and it is desirable to control and monitor the current supplied to the loads from a central location. The present invention also may be retrofitted to existing aircraft. The advantages of the present invention invention are also particularly useful in applications where space and weight are limited because it eliminates the need for hardwire communication network to provided centralized control and monitoring functions.

In particular, in one embodiment, the invention uses a wireless communication network connecting control nodes with master nodes to control and monitor a solid state power controller, in contrast to prior art systems, which relied on hardwired connections for control and communication. In this way, the master node may remotely turn on and off the electrical power to the load, in contrast to prior art systems, which required a hardwired connection to turn on and off electrical power to the load. The control node may also report the state of the sensed current to the master node through the wireless communication network, in contrast to prior art systems, which relied on hardwired connections to monitor the state of sensed load currents.

Figure 1:
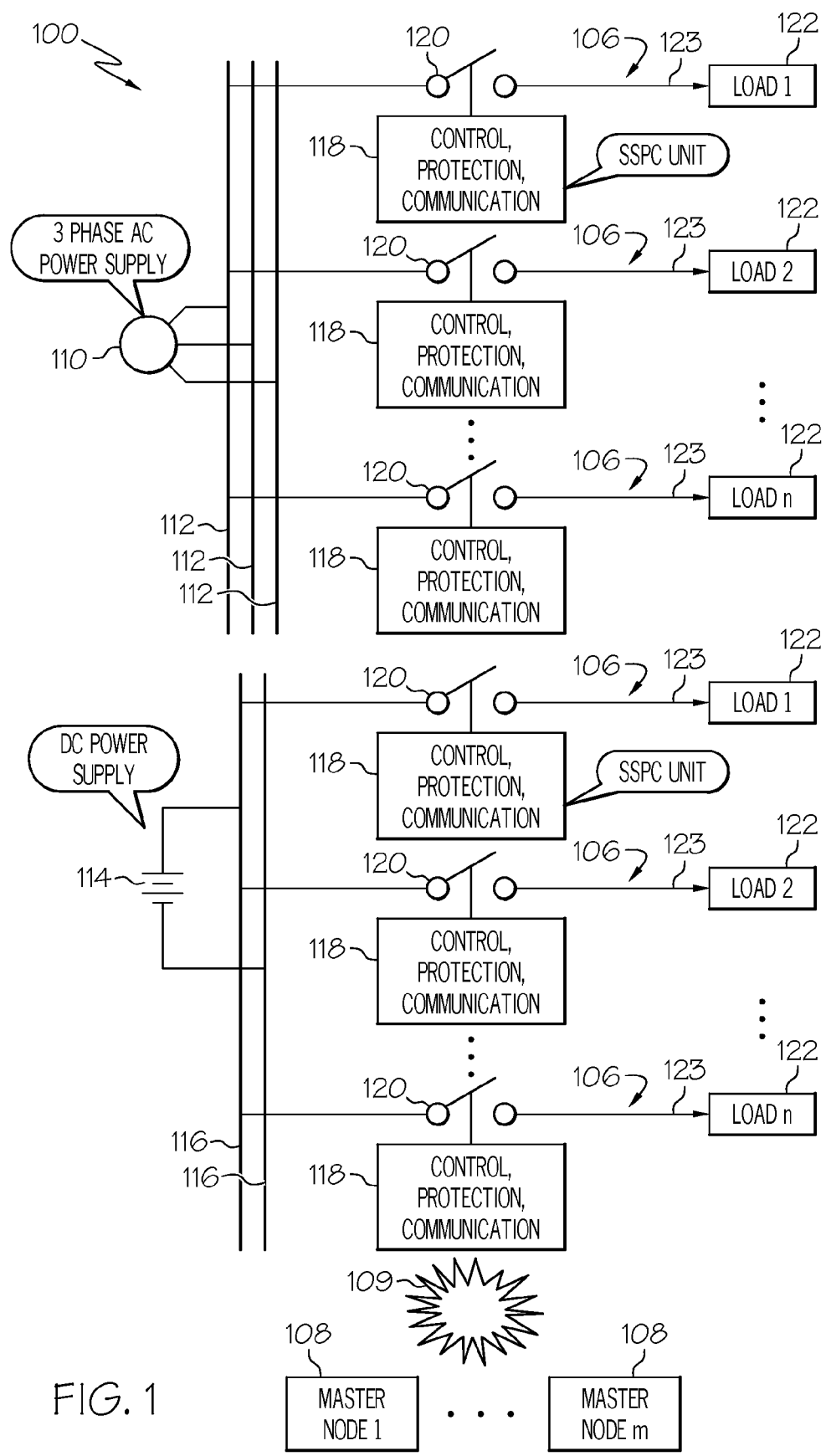
FIG. 1 is a block diagram of a network-based secondary electric power distribution system in accordance with one embodiment of the invention.

FIG. 1 shows a network-based secondary electric power distribution system (SEPDS) 100 in accordance with one embodiment of the present invention. The SEPDS 100 may supply electrical power through one or more types of electric power distribution subsystems. The embodiment in FIG. 1 shows two different electric power subsystems, an alternating current (AC) power distribution subsystem 102 and a direct current (DC) power distribution subsystem 104, each of which may have one or more control nodes 106. The SEPDS 100 may also include one or more master nodes 108, which may be linked to the control nodes 106 through a communication system 109. Master nodes 108 may control the operation of the control nodes 106 as described in more detail below. Communication system 109 may either be a wireless communication network or a power line carrier communication network.

In general, the master nodes 108 may operate as a gateway that may use the communication system 109 to transmit and receive information, such as command data and status data, to and from a control node 106. The master nodes 108 may also exchange information through the same communication system 109 with any external system, which may include other intelligent systems that have access to the communication system 109 on the aircraft. The exact number of master nodes 108 may be depend on many factors, such as redundancy requirements, data throughput requirements, protocol requirements and other system requirements. The number of master nodes may typically be less than the number of control nodes 106 by a ratio of about 1 to 50.

Each electric power subsystem 102 may comprise a source of electrical power. In the case of electrical power subsystem 102, an AC power supply 110 may supply AC power through a plurality of AC power lines 112 to each control node 106. In the case of electrical power subsystem 104, a DC power supply 114 may supply DC electrical power to the control nodes 106 through a plurality of DC power lines 116. Electrical power may be supplied to a plurality of loads 122 through feeder lines 123.

Each control node 106 may include a solid state power controller (SSPC) engine 118 and a solid state switch 120. The SSPC engine 118 may perform control, protection and communication functions. In particular, SSPC engine 118 may switch on and off the power to the loads 122 through the solid state switch 120, monitor and protect the load 122 and feeder lines 123, and communicate with the master nodes 108, as described in more detail below. The solid state switch 120 may be any kind of solid state power device (e.g. MOSFET) that is capable of blocking and conducting electric current on command.

Communication system 109 in the embodiment shown in FIG. 1 may comprise any one of a variety of communication systems such as an ultra low power spread spectrum wireless communication system. The communication system 109 may utilize a meshed network topology, which may allow each control node 106 to communicate with other control nodes 106 as well as to the well as to the master nodes 108. As a result, the SEPDS 100 may have the features of being self-healing, by allowing some of the functions of malfunctioning control nodes 106 to be performed by other control nodes 106. Also, the SEPDS 100 may have plug-play characteristics, so that individual components such as control nodes 106 and master nodes 108 may be easily replaced without replacing other components.

Figure 2:
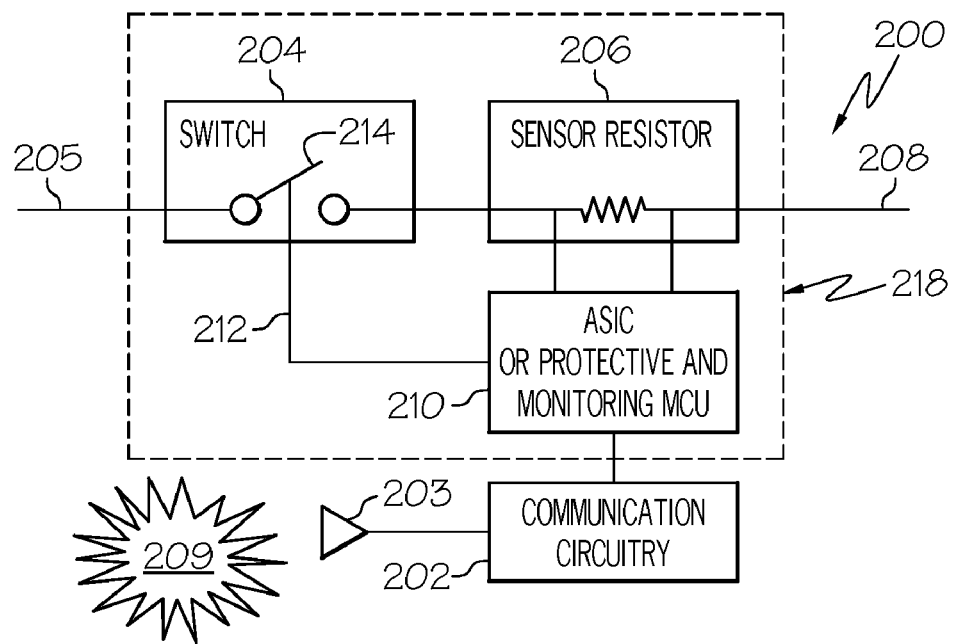
FIG. 2 is a block diagram of a control node used in a wireless embodiment of the network-based secondary electric power distribution system shown in FIG. 1.

FIG. 2 shows a control node 200 in accordance with one embodiment of the invention, which may use a wireless communication system 209. Control node 200 may comprise a SSPC 218 that communicates with the wireless communication system 109 using a communication circuit 202 having an antenna 203. A variety of communications standards may be used, such as the ZigBee and IEEE 802.15.4 standards.

Control node 200 also may include a switch 204, which may receive electrical power at a first end from a DC or an AC power line 205. Switch 204 may also be connected at a second end to a sensor resistor 206. Sensor resistor 206 may comprise a low resistance value resistor as will be apparent to those skilled in the art. Line 208 may connect sensor resistor 206 to a load (not shown).

A microcontroller (MCU) 210 may be connected to the communication circuitry 202, the switch 204 and to the sensor resistor 206. The MCU 210 may have two primary functions, to turn switch 204 on and off as commanded by a master node 108, and to provide over current protection. For the on and off function, MCU 210 may receive an on or off command from a master node 108 through the communication circuitry 202 and respond by sending a signal to a gate 214 of switch 204 turning the switch on or off.

The over current protection function of MCU 210 may be accomplished by sensing the current through the sense resistor 206 and determining if an over current condition exists. If the sensed current exceeds a predetermined threshold, the microcontroller unit may be programmed to open switch 204 by sending a signal through line 212 to switch gate 214 causing it to turn off switch 204.

Figure 3:
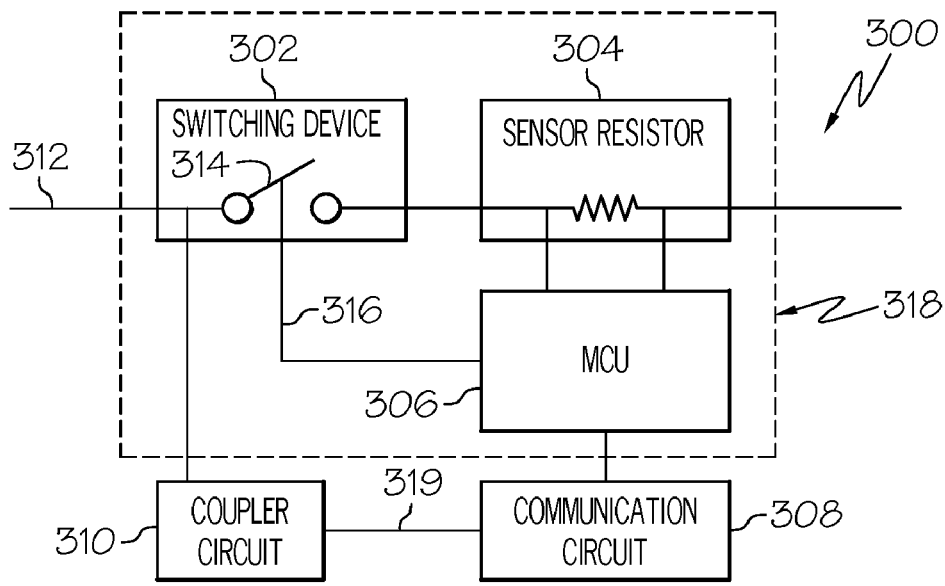
FIG. 3 is a block diagram of a control node used in a power line carrier embodiment of the network-based secondary electric power distribution system shown in FIG. 1.

FIG. 3 shows a control node 300 in accordance with another embodiment of the invention. Instead of using a wireless communication system as was the case with control node 200, control node 300 may use a power line carrier (PLC) communication system. Control node 300 may comprise a SSPC 318 that includes an switch 302 having a gate 314, a sensor resistor 304 and an MCU 306 that may be similar in function to the switch 204, sensor resistor 206 and MCU 210, respectively, shown in FIG. 2. MCU may be connected to the gate 314 through line 316.

Control node 300 may include a PLC communication circuit 308 and a coupler circuit 310. PLC communication circuit 308 receives and transmits information between the MCU 308 and the master nodes 108. In particular, the coupler circuit 310 may couple the communication circuit 308 to the master nodes 108 by receiving and detecting information signals from a power line 312 through line 320. The information signal may be sent from coupler circuit 310 to communication circuit 308 through line 318. Also, in the reverse direction, coupler 310 may receive information signals from the communication circuit 308 and transforms these signals into a signal that may be sent to the master nodes 108 through the power line 312. In one embodiment of the invention, PLC communication circuit 308 and coupler circuit 310 may comprise standard products including transceivers available from Echelon Corporation for the LonWorks® networking platform. In this power line carrier embodiment, similar LonWorks® networking products may also be used in the master nodes 108 for receiving and transmitting information, as shown in more detail in FIG. 6.

Figure 4:
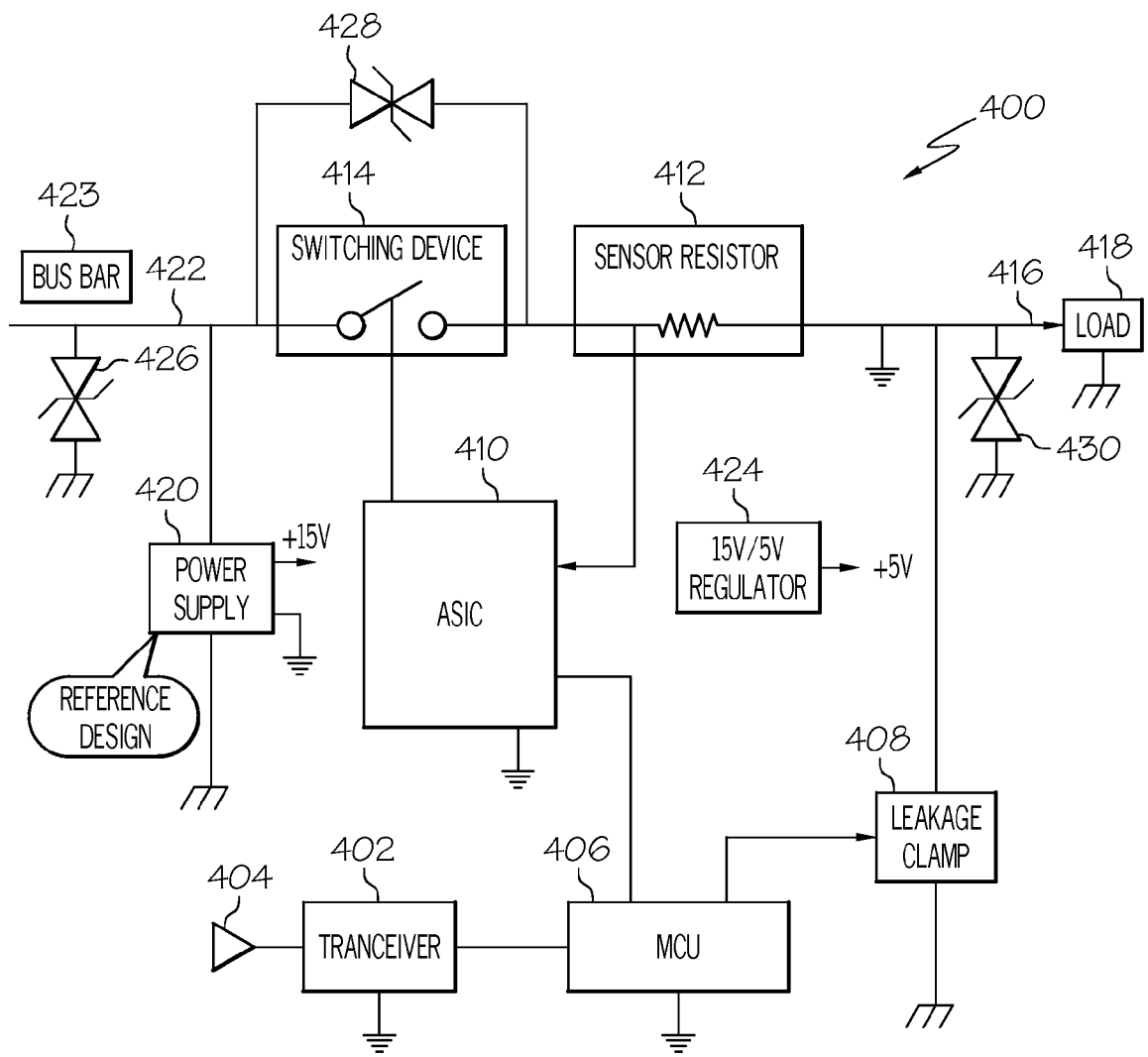
FIG. 4 is a block diagram of a wireless control node in one embodiment of the network-based secondary electric power distribution system shown in FIG. 1.

FIG. 4 shows a block diagram of an exemplary embodiment of a control node 400 that may be used with the SEPDS 100 shown in FIG. 1. Control node 400 comprises a SSPC that uses wireless communications to communicate with the master nodes 108 and may perform the same functions as control node 200 shown in FIG. 2. Wireless communication between control node 400 and master nodes 108 may be through radio frequency signals received by an antenna 404 connected to a wireless transceiver 402, which may comprise a Freescale Semiconductor® low power wireless transceiver part number MC13192. The MC13192 may support the ZigBee® and IEEE 802.15.4 standards and may generate wireless power of about 1 mw and having a communication distance of between about 10 and 50 meters.

Wireless transceiver 402 also may be connected to an MCU 406, which may comprise a Freescale Semiconductor® part number MC9S08GT60 8 bit microcontroller. MCU 406 may be programmed to perform the control node functions described above. MCU 406 may be is connected to a leakage clamp circuit 408, which may be used for the purpose of bypassing the leakage current of the switch 414 when the switch 414 is off. It is well recognized that some solid state power switching devices, such as MOSFETs, have a leakage current when in the off state due to the junction capacitance, which may cause a safety concern. Therefore, the leakage clamp circuit 408 is configured to be on when the switch 414 is off and to be off when the switch 414 is on, thus bypassing the leakage current so it does not reach the load 418.

MCU 406 also may be connected to an application specific integrated circuit (ASIC) 410. During normal operating conditions, ASIC 410 may provide the proper drive signal to turn the switch 414 on and off when commanded by the MCU 406. During over current conditions ASIC 410 may turn the switch 414 off when a current sense signal from a sensor resistor 412 indicates an over current condition. In particular, ASIC and MCU 406 may use this current sense signal to estimate the thermal energy level inside a feeder line 416 connected to a load 418. When this estimated thermal energy level exceeds a predetermined threshold, ASIC 410 may send a signal that turns the switch 414 off. The ASIC 414 and MCU 406 also may provide feedback signals regarding load and trip status the master nodes 108, shown in FIG. 1. Master nodes 108 may transmit this information to an aircraft load management system (not shown). Three transient voltage suppressors, also known as "transorbs", 426, 428 and 430 may be employed to absorb transient voltages.

In one embodiment of the invention, a power supply 420 may receive AC electrical power from a power line 422 and BUS bar 423 and convert the AC power into a +15 volt, 50 mA DC output. A voltage regulator 424 may convert the +15 volt output into a +5 volt, 25 mA output, which may be used to provide the electrical power to the various components in the control node 400. Power supply 420 and voltage regulator 424 may be isolated from BUS bar 423.

Figure 5:
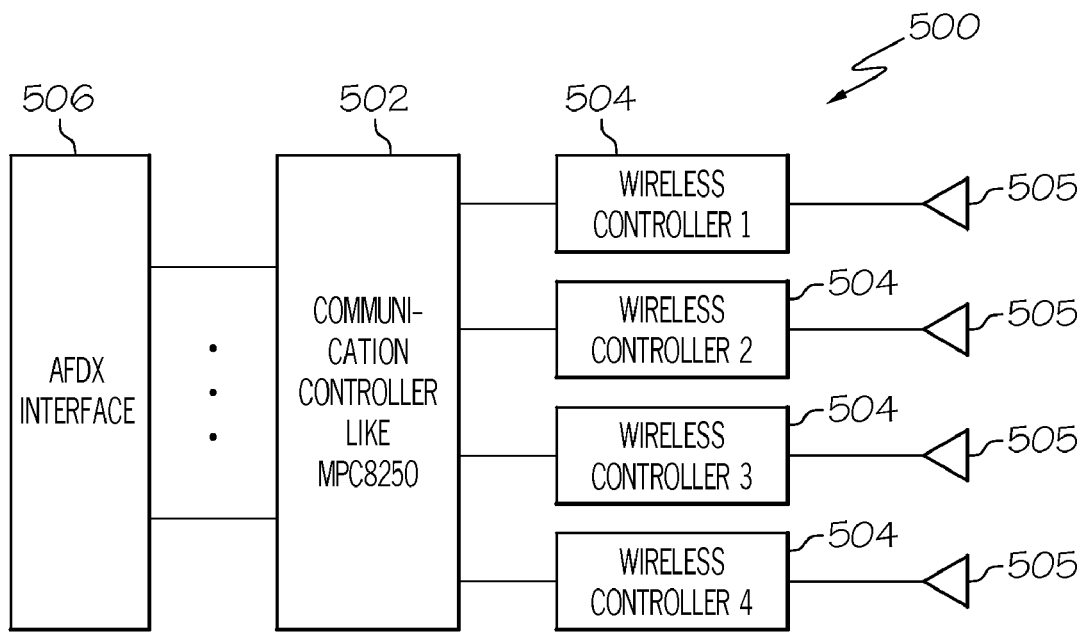
FIG. 5 is a block diagram of a master node used in a wireless embodiment of the network-based secondary electric power distribution system shown in FIG. 1.

FIG. 5 shows an exemplary master node 500, which may be used as one of the master nodes 108 shown in FIG. 1, for an embodiment of the invention where the communication system 109 in FIG. 1 is a wireless communication system. Master node 500 may include a wireless communication controller 502 in conjunction with a wireless controller 504. An antenna 505 may be connected to the wireless controller 504 for transmitting and receiving radio frequency signals to and from one or more of the control nodes 106. For improved system reliability, additional redundant wireless controllers 504 may also be connected to the communication controller 502. As shown in FIG. 5, a total of four wireless controllers may be used, although other numbers of wireless controllers may be used depending on the particular needs of the SEPDS 100.

In one embodiment of the invention, wireless communication controller 502 comprises a low power wireless communication controller such as the Freescale Semiconductor® MPC8250, and the wireless controller 504 may be a Freescale Semiconductor® MC13192, such as the wireless transceiver 402 described above and shown in FIG. 4. Both the communication controller 502 and the wireless controller 504 may implement the IEEE 802.15.4 standard. Communication controller 502 may be coupled to an avionics full-duplex switched Ethernet (AFDX) interface 506. AFDX defines a low-level network and a low-level network and protocol to communicate between avionics devices in an aircraft. The AFDX interface may receive and transmit information to and from an AFDX network (not shown).

Furthermore, the communication controller 502 may be configured in a meshed network topology, utilizing the ZigBee® protocol. A meshed network topology, may improve network reliability since each control node will have the ability to relay information to its adjacent control nodes and to the master nodes so that the system may be self-healing and plug-play.

Figure 6:
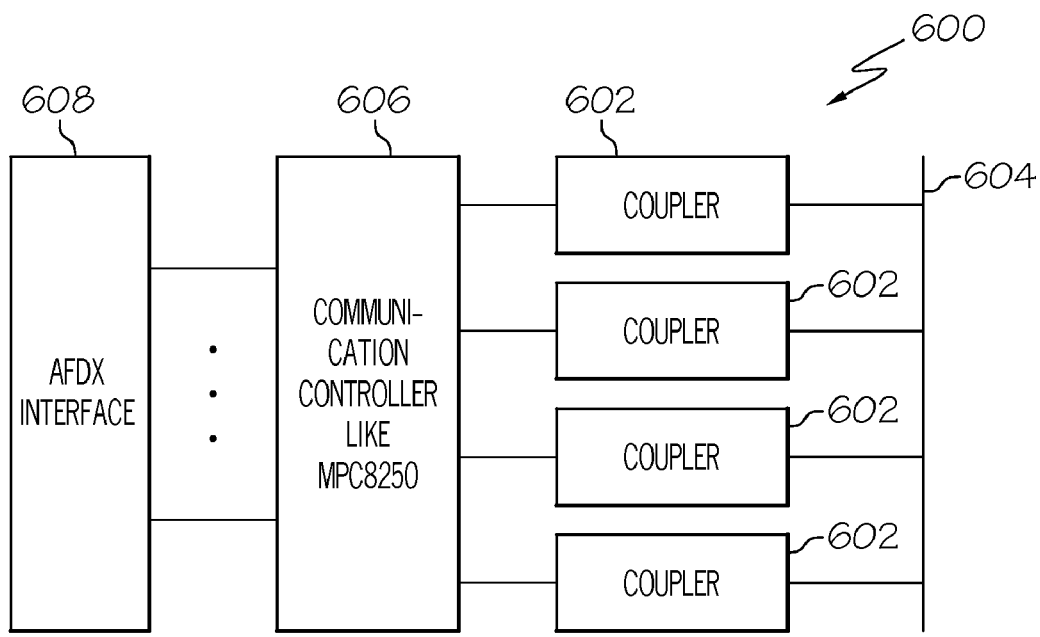
FIG. 6 is a block diagram of a master node used in a power line carrier embodiment of the network-based secondary electric power distribution system shown in FIG. 1.

FIG. 6 shows a master node 600 that is adapted to be used with a power line carrier communication system. Master node 600 may be compatible with control node 300 shown in FIG. 3. A coupler circuit 602 may receive information from a carrier signal on a power line 604. This signal may be detected by the coupler circuit 602 and sent to a communication controller 606, which may be similar to communication circuit 308 shown in FIG. 3. An AFDX interface 608 may receive the information from the communication controller 606 in a receive mode and send it to an AFDX interface 608. The AFDX interface 608 may send received information to other systems on the aircraft through an AFDX network (not shown).

In a transmit mode, in accordance with one embodiment of the invention, commands may be sent from a system on an aircraft through an AFDX network (not shown) to the AFDX interface 608. These commands may be sent by the AFDX interface 608 to the communication controller 606, which in turn may convert the information into a signal that is applied to a carrier signal on the power line 604. As with the Communication controller 502 in FIG. 5, the communication controller 606 may be implemented in a meshed network such as the ZigBee® protocol.

Figure 7:
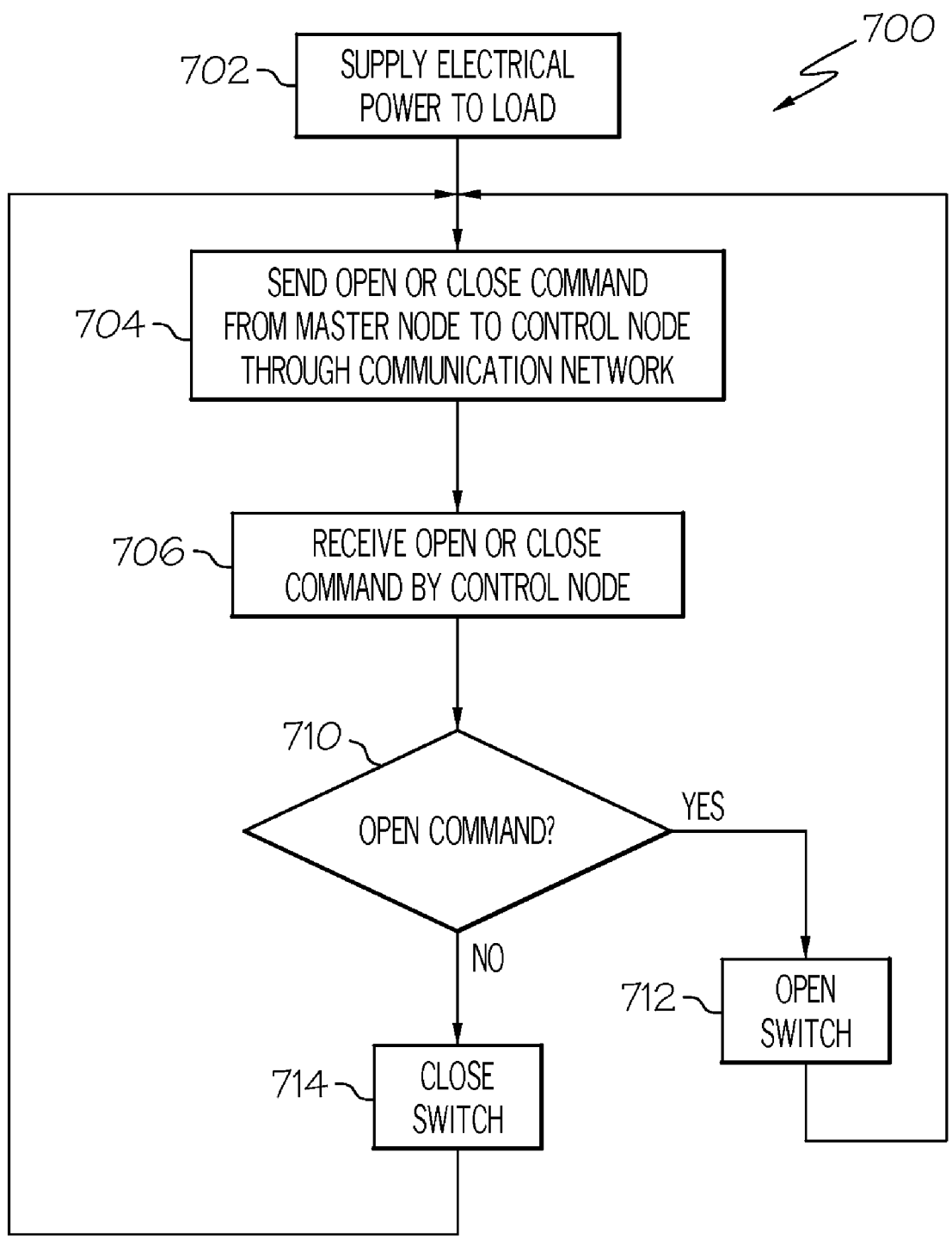
FIG. 7 is a flow chart of a method for controlling a secondary electric power distribution system in accordance with one embodiment of the invention.

FIG. 7 shows a method 700 for controlling an electric power distribution system in accordance with another embodiment of the invention. In step 702 electrical power may be supplied from a source (e.g. a generator 110 or a battery 114) to a load, such as load 122. In step 704 a master node 108 may send a command to a control node 106 to either open or close a switch 120 connecting the load 122 to the source, 110 or 114, of electrical power. This command may be sent to the control node 106 through either a wireless, a power line carrier or other communication system 109.

In step 706 the control node 106 may receive the command and determines, in step 710 if it is an open command or not. If the received command is an open command as determined in step 710, step 712 may open the switch 126, thereby disconnecting the load 122 from the source, 110 or 114, of electrical power. The process 700 then may return to step 704 until another command is sent by the master node 108. If step 710 determined that the command was not an open command, then the only other possibility is that it is a close command and step 714 may close the switch 120 thereby connecting the load 122 to the source, 110 or 114, of electrical power.

It should be understood, of course, that the foregoing relates to exemplary embodiments of the invention and that modifications may be made without departing from the spirit and scope of the invention as set forth in the following claims.

We claim:

1. An electric power distribution system comprising:
    at least one source of electrical power;
    at least one load connected by a conductor to said at least one source of electrical power;
    a switch disposed across said conductor, said switch connecting said load to said at least one source of electrical power when in a closed state and disconnecting said load from said at least one source of electrical power when in an open state;
    at least one master node;
    a wireless communication network carrying commands from said master node to said switch to open said switch and commands to close said switch; and
    an avionics full-duplex switched Ethernet (AFDX) system in an aircraft, said AFDX being connected to said master node, said AFDX system being configured to receive commands from at least one component of said aircraft to open and close said switch.

2. The electric power distribution system of claim 1 further comprising:
    a control node connected to said switch and controlling said state of said switch; and
    wherein said wireless communication network carries information between said master node and said control node, said information including said commands from said master node to said control node to open said switch and commands from said master node to said control node to close said switch.

3. The electric power distribution system of claim 2 further comprising:
    a sensor connected to said conductor and to said control node, wherein said sensor detects a current passing through said conductor, wherein said control node opens said switch when said current detected by said sensor is above a predetermined threshold.

4. The electric power distribution system of claim 3 wherein said information carried by said wireless communication network includes information regarding said current detected by said sensor.

5. The electric power distribution system of claim 2 further comprising:
    an additional load connected to said source of electrical power through an additional conductor;
    an additional switch disposed across said additional conductor, said additional switch connecting said load to said source of electrical power when in a closed state and disconnecting said load from said source of electrical power when in an open state;
    an additional control node connected to said additional switch, and said additional control node controlling said state of said additional switch; and
    said wireless communication network carrying information between said master node and said additional control node.

6. The electric power distribution system of claim 5 further comprising an additional master node connected by said communication system to said additional control node.

7. The electric power distribution system of claim 2 further comprising:
    an additional source of electrical power;
    an additional load connected by an additional conductor to said additional source of electrical power;
    an additional switch disposed across said additional conductor, said additional switch connecting said additional load to said additional source of electrical power when in a closed state and disconnecting said additional load from said additional source of electrical power when in an open state;
    an additional control node connected to said additional switch and controlling said state of said additional switch; and
    said wireless communication network carrying information between said master node and said additional control node, said information including commands from said master node to said additional control node to open and close said additional switch.

8. The electric power distribution system of claim 7 wherein said source of electrical power and said additional source of electrical power each provide electrical power of a type selected from the following: alternating current electrical power and direct current electrical power.

9. The electric power distribution system of claim 1 wherein said wireless communication network is a radio frequency communication network.

10. The electric power distribution system of claim 1 wherein said wireless communication network is a power line carrier communication network.

11. The electric power distribution system of claim 10 wherein said power line carrier communication network uses signals transmitted along a portion of said conductor located between said source of electrical power and said switch to transmit and receive said information.

12. The electric power distribution system of claim 2 wherein said control node includes a solid state power controller.

13. A system for sensing electrical power transferred to a load within an aircraft comprising:
    a load comprising at least one electrical component of said aircraft;
    a source of electrical power within said aircraft connected by a conductor to said load;
    a sensor within said aircraft connected to said conductor, said sensor detecting a current passing through said conductor to said load;
    a microcontroller within said aircraft connected to said sensor; and
    a wireless communication network within said aircraft coupled to said sensor and to said microcontroller, said wireless communication network being configured to transmit information a distance of between about 10 and 50 meters, within said aircraft, regarding said current detected by said sensor.

14. The system of claim 13 further comprising a master node connected to said wireless communication network, said master node receiving said information regarding said current detected by said sensor.

15. The system of claim 14 further comprising a switch disposed across said conductor, said switch connecting and disconnecting said load from said source of electrical power in response to a signal sent by said microprocessor, wherein in response to said detected current exceeding a predetermined threshold, said microprocessor sends said signal to said switch disconnecting said load from said source of electrical power.

16. The system of claim 13 wherein said sensor comprises a resistor connected to said microcontroller.

17. A method for controlling an electric power distribution system within an aircraft comprising:

transferring electrical power from a source within an aircraft to a load through a conductor, said conductor having a switch connected to a control node, said load being an electrical component of said aircraft;

receiving at least one command from at least one component of said aircraft with a master node comprising an avionics full-duplex switched Ethernet (AFDX) system;

sending a plurality of commands from said master node to said control node through a powerline carrier communication network, said plurality of commands including commands to open said switch and commands to close said switch;

receiving said plurality of commands in said control node through said powerline carrier communication network;

sending a plurality of signals to said switch from said control node, a first type of said plurality of signals causing said switch to open and a second type of said plurality of signals causing said switch to close;

opening said switch in response to said command to open said switch and closing said switch in response to said command to close said switch; and said step of opening and said step of closing said switch effectuating the operation of said electrical component of said aircraft.

18. The method of claim 17 further comprising:

sensing a current in said conductor using a sensor, said sensor being connected to said control node;

determining if said sensed current is above or below a predetermined threshold; and turning said switch off if said sensed current is above a predetermined threshold.

19. The method of claim 18 further comprising:

sending an information signal from said control node to said master node through said powerline carrier communication network, said information signal including information regarding said sensed current.

* * * * *